(12) United States Patent
Farinola et al.

(10) Patent No.: US 12,347,960 B2
(45) Date of Patent: Jul. 1, 2025

(54) SYSTEM AND METHOD FOR LOCKING ELECTRICAL TERMINALS

(71) Applicant: TE Connectivity Italia Distribution S.r.l., Turin (IT)

(72) Inventors: Marcello Farinola, Turin (IT); Cinzia Alferi, Turin (IT); Alessandro Genta, Turin (IT)

(73) Assignee: TE Connectivity Italia Distribution S.R.L, Turin (IT)

( * ) Notice: Subject to any disclaimer, the term of this patent is extended or adjusted under 35 U.S.C. 154(b) by 416 days.

(21) Appl. No.: 17/729,606

(22) Filed: Apr. 26, 2022

(65) Prior Publication Data
US 2022/0344858 A1    Oct. 27, 2022

(30) Foreign Application Priority Data

Apr. 27, 2021 (IT) .......................... 102021000010583

(51) Int. Cl.
| | |
|---|---|
| H01R 13/436 | (2006.01) |
| H01R 13/502 | (2006.01) |
| H01R 13/627 | (2006.01) |
| H01R 13/629 | (2006.01) |
| H01R 13/639 | (2006.01) |

(52) U.S. Cl.
CPC ....... *H01R 13/4362* (2013.01); *H01R 13/502* (2013.01); *H01R 13/6271* (2013.01); *H01R 13/629* (2013.01); *H01R 13/639* (2013.01)

(58) Field of Classification Search
CPC .................................................. H01R 13/4361
See application file for complete search history.

(56) References Cited

U.S. PATENT DOCUMENTS

| | | | | |
|---|---|---|---|---|
| 4,721,478 A | * | 1/1988 | Sonobe .............. | H01R 13/4367 439/589 |
| 5,554,055 A | * | 9/1996 | Miller ................ | H01R 13/4362 439/752 |
| 5,782,657 A | * | 7/1998 | Wolla ................. | H01R 13/5221 439/595 |
| 7,270,563 B2 | | 9/2007 | Mossner et al. | |

(Continued)

FOREIGN PATENT DOCUMENTS

| | | |
|---|---|---|
| JP | 2012069463 A | 4/2012 |
| JP | 2018206518 A | 12/2018 |

OTHER PUBLICATIONS

Italian Search Report, Application No. 102021000010583, Dated: Jan. 18, 2022, 14 pages.

(Continued)

*Primary Examiner* — Oscar C Jimenez
(74) *Attorney, Agent, or Firm* — Barley Snyder (57) ABSTRACT

A cable inlet assembly for an inlet housing includes a cable inlet cover covering an inlet for at least one cable, and a locking element slidable between an unlocked position and a locked position. The locking element includes at least one opening adapted to receive a terminal of the at least one cable, and a first coupling element adapted to be coupled with a second coupling element of the cable inlet cover. The displacement of the cable inlet cover along a vertical direction induces a sliding of the locking element along an orthogonal direction between the unlocked position and the locked position for locking a position of the terminal.

20 Claims, 13 Drawing Sheets

(56) References Cited

U.S. PATENT DOCUMENTS

| | | | |
|---|---|---|---|
| 7,410,372 | B2 | 8/2008 | Johnson et al. |
| 10,850,631 | B2 | 1/2020 | Myer et al. |
| 10,938,146 | B2 | 3/2021 | Wattenhofer et al. |
| 2004/0253884 | A1 | 12/2004 | Sakurai et al. |
| 2015/0118885 | A1 | 4/2015 | Holub et al. |
| 2016/0372862 | A1 | 12/2016 | Kim et al. |
| 2017/0250489 | A1* | 8/2017 | Nishi .................. H01R 13/506 |
| 2020/0220300 | A1 | 7/2020 | Wattenhofer et al. |
| 2020/0223321 | A1 | 7/2020 | Myer et al. |
| 2021/0242620 | A1* | 8/2021 | Saito ................ H01R 13/4361 |

OTHER PUBLICATIONS

Examination Report from the Intellectual Property Office of India dated Jan. 19, 2023, corresponding to Application No. 202244023747, 5 pages.

French Search Report dated Jul. 24, 2024 with English translation, corresponding to Application No. FR2203759, 20 pages.

\* cited by examiner

SYSTEM AND METHOD FOR LOCKING ELECTRICAL TERMINALS

CROSS-REFERENCE TO RELATED APPLICATIONS

This application claims the benefit of Italian Patent Application No. 102021000010583, the whole disclosure of which is incorporated herein by reference.

FIELD OF THE INVENTION

Embodiments of the present disclosure generally relate to electrical terminals. In particular, the present disclosure relates to a locking element configured to block rearward movement of a cable terminal in a locked position and to be coupled with a cable inlet cover.

BACKGROUND

It is known at the state of the art to provide an inlet housing with a locking element for holding the electrical terminals connected to the electrical device in position. For example, U.S. Pat. No. 10,850,631 discloses a receptacle connector for a charging inlet assembly provided with a cover to be coupled to the rear of a housing to enclose the chamber. The cover may include cable exits (for example, openings) that receive the power cables and allow the power cables to exit the chamber. The charging inlet assembly may further include a secondary lock assembly for locking the terminal assemblies in the housing. The secondary lock assembly can slide in the housing between a locked position and an unlocked position. In the locked position, the secondary lock assembly engages the terminal assemblies and blocks the terminal assemblies from backing out of the terminal channels.

U.S. Pat. No. 7,410,372 discloses an electrical box assembly having a body, a cover pivotally connected to the body and different bases designed to accommodate different electrical devices mounted in the electrical box and to block their position. Each base has a dimension complementing the shape of the electrical box and is provided with keyhole shaped apertures, which are configured to receive a screw to couple the base to the electrical receptacle and electrical box. During assembly operations, screws are unscrewed at a distance to allow the head of the screw to pass through the large open area of the keyhole shaped opening.

U.S. Patent Publication 2020/0220300 discloses a device housing for an electrical device comprising an inner housing with a lower shell and an upper shell. The inner housing comprises a cable seating profile formed in the lower shell and a flush cable cover profile formed in the upper shell. Cable insertion openings are formed in the housing for inserting a cable which can be routed to the device. The inner housing further retains a clamping body, which is configured in such a way that it can be pressed onto an outer surface of the cable and it can form a friction-fitting contact and hold the cable in position.

In the configurations described above, it is necessary that the operator, after connecting the cables to the electrical terminals in the inlet housing, manually places a locking element to hold the electrical terminals in position and then fixes the locking element by means of screws. Finally, the operator mounts the cover onto the inlet housing and fixes it by snapping the locking features along its contour. As a result, these arrangements are difficult to assemble, as they require precise alignment of all the components, and they further require the use of screws to fix the locking element to the other electrical elements. Moreover, the assembly process is time-consuming.

Accordingly, there is a need to address the problems stated above by providing a locking element which automatically slides to the locking position, when it is pushed by the corresponding cable inlet cover, and which does not require the presence of screws to be fixed to the inlet housing.

SUMMARY

According to an embodiment of the present disclosure, a cable inlet assembly for an inlet housing includes a cable inlet cover covering an inlet for at least one cable, and a locking element slidable between an unlocked position and a locked position. The locking element includes at least one opening adapted to receive a terminal of the at least one cable, and a first coupling element adapted to be coupled with a second coupling element of the cable inlet cover. The displacement of the cable inlet cover along a vertical direction induces a sliding of the locking element along an orthogonal direction between the unlocked position and the locked position for locking a position of the terminal.

BRIEF DESCRIPTION OF THE DRAWINGS

The invention will now be described by way of example with reference to the accompanying Figures, of which.

DETAILED DESCRIPTION OF THE EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
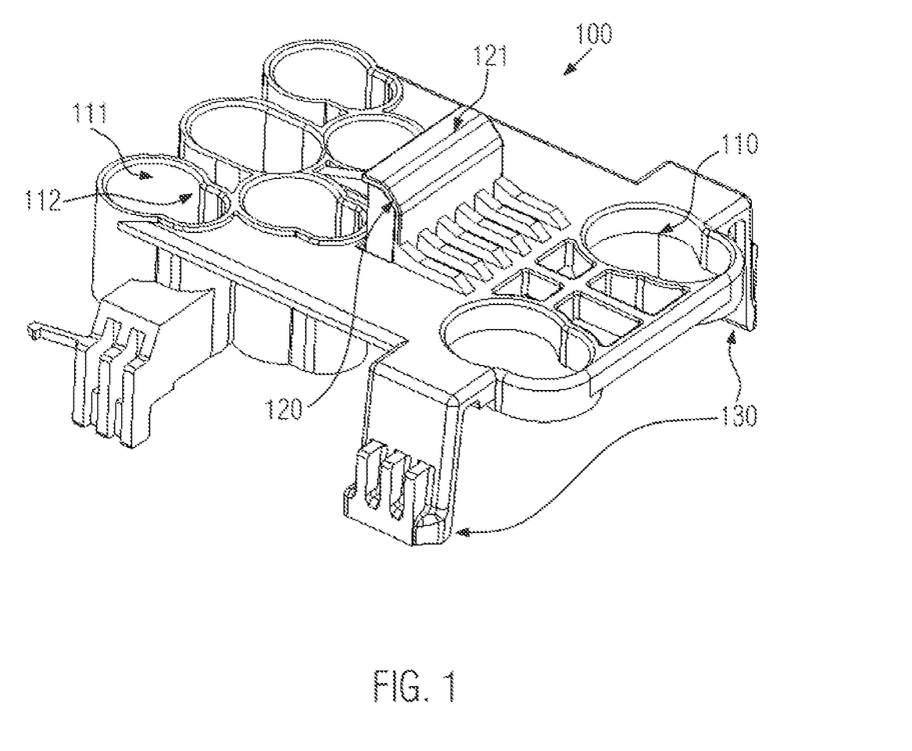
FIG. 1 schematically illustrates a three dimensional view of the locking element, according to an embodiment of the present invention.

FIG. 1 schematically illustrates a three-dimensional view of a locking element 100 for locking the position of a terminal assembly, according to an embodiment of the present disclosure. In an exemplary embodiment, the locking element 100 may be a secondary locking element for blocking the position of a terminal assembly in an inlet housing. The locking element 100 is slidable in a corresponding housing between an unlocked position and a locked position. In the locked position, the locking element engages the terminal and blocks it from backing out of the terminal channel of the housing. The locking element 100 comprises a substantially flat surface provided with a plurality of openings 110 for the insertion of corresponding cables with terminals. The locking element 100 is further provided with base elements 130, which are configured to ensure correct sliding of the locking element 100 in the inlet housing.

Figure 4:
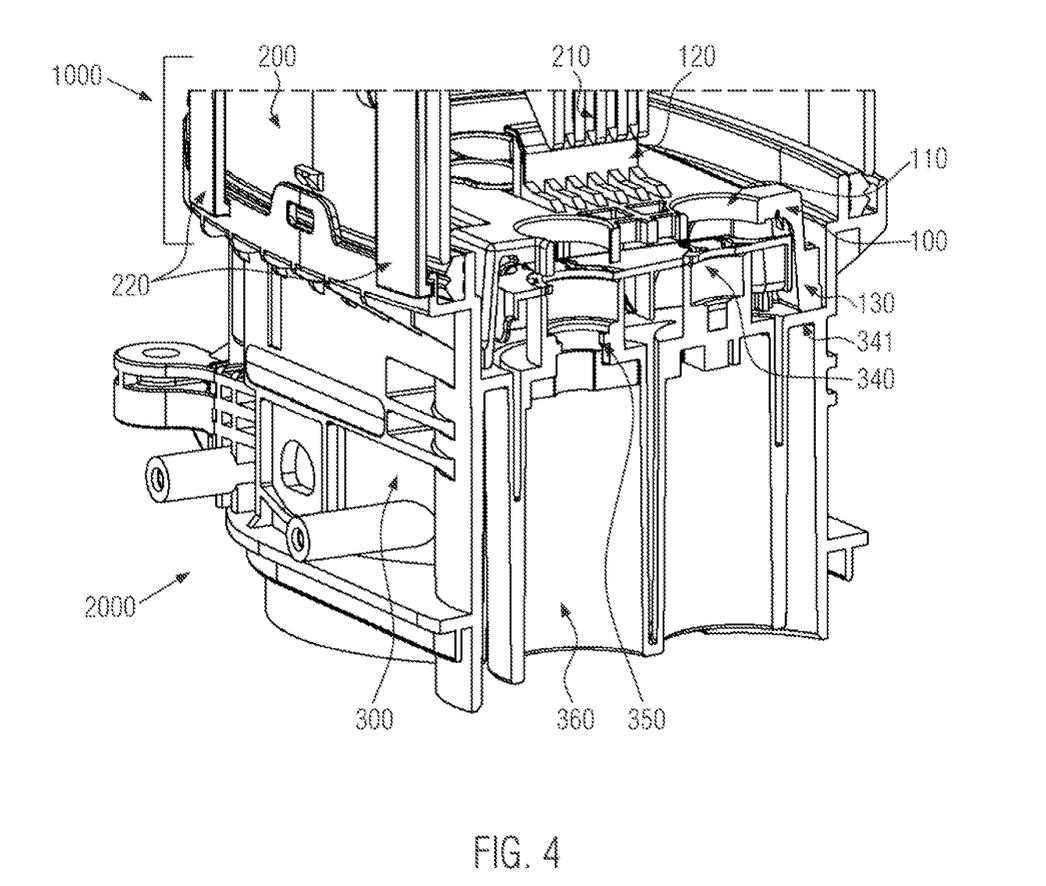
FIG. 4 schematically illustrates a cutout lateral view of the inlet housing assembly, according to an embodiment of the present invention.
Figure 10:
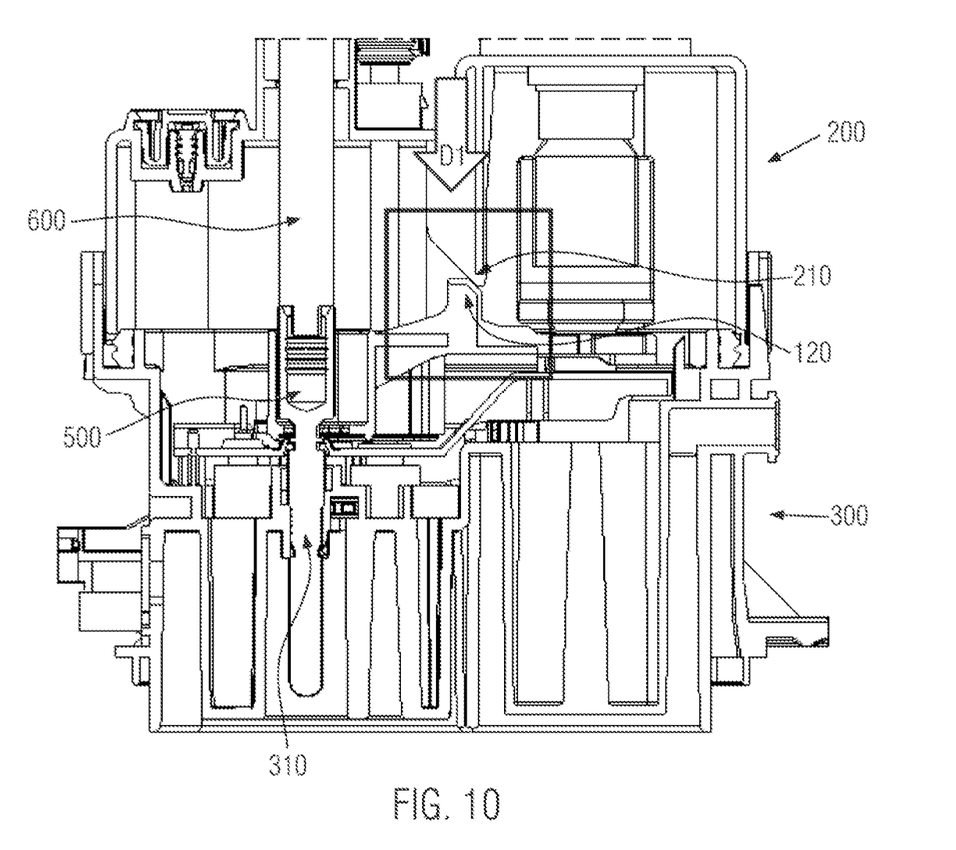
FIG. 10 schematically illustrates a sectional view of the inlet housing assembly in an initial configuration, wherein the locking element is in the unlocked position, according to an embodiment of the present invention.
Figure 11:
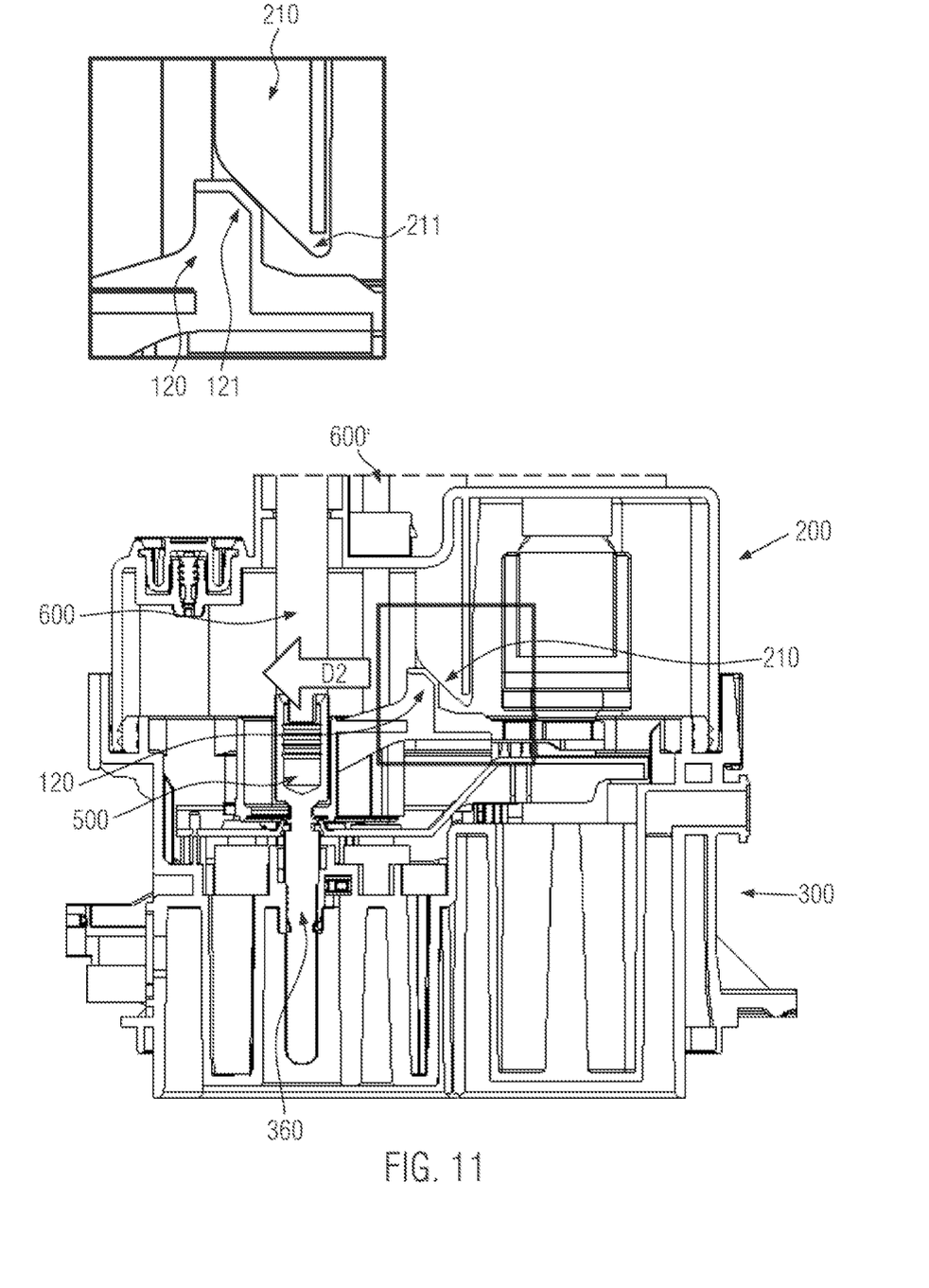
FIG. 11 schematically illustrates a sectional view of the inlet housing assembly in a final configuration, wherein the locking element is in the locked position, according to an embodiment of the present invention.

On the flat surface of the locking element 100, a first coupling element 120 is formed, which allows the automatic sliding of the locking element 100. The first coupling element 120 is configured to be coupled with the corresponding second coupling element 210 formed on the cable inlet cover 200, as shown in FIGS. 4, 10 and 11 below. The first coupling element 120 comprises a sliding element, and in particular, comprises a first slanted surface 121, which can slide over the corresponding second slanted surface 211 of the cable inlet cover 200.

Each opening 110 of the locking element 100 has the shape of two intersecting circles and comprises a first circle 111 and a second circle 112. As it can be clearly seen in FIGS. 1 and 8, the first circle 111 is larger than the second circle 112 and it is larger than the diameter of the terminal of the cable that is inserted into the opening 110. The second circle 112 has a diameter that is equal to the diameter of the terminal of the cable that is inserted into the opening. In this way, the terminal is initially easily inserted into the first circle 111 and it is free to slightly move from its initial, unlocked position to its final, locked position. In fact, after sliding the locking element 100, the terminal is driven to the locked position, in which it is inserted into the second circle 112. Since the second circle 112 has a diameter that is comparable with the diameter of the terminal, the terminal is no longer free to move from this position and the perfect and reliable connection to the corresponding electrical terminal of an inlet housing is ensured.

Figure 8:
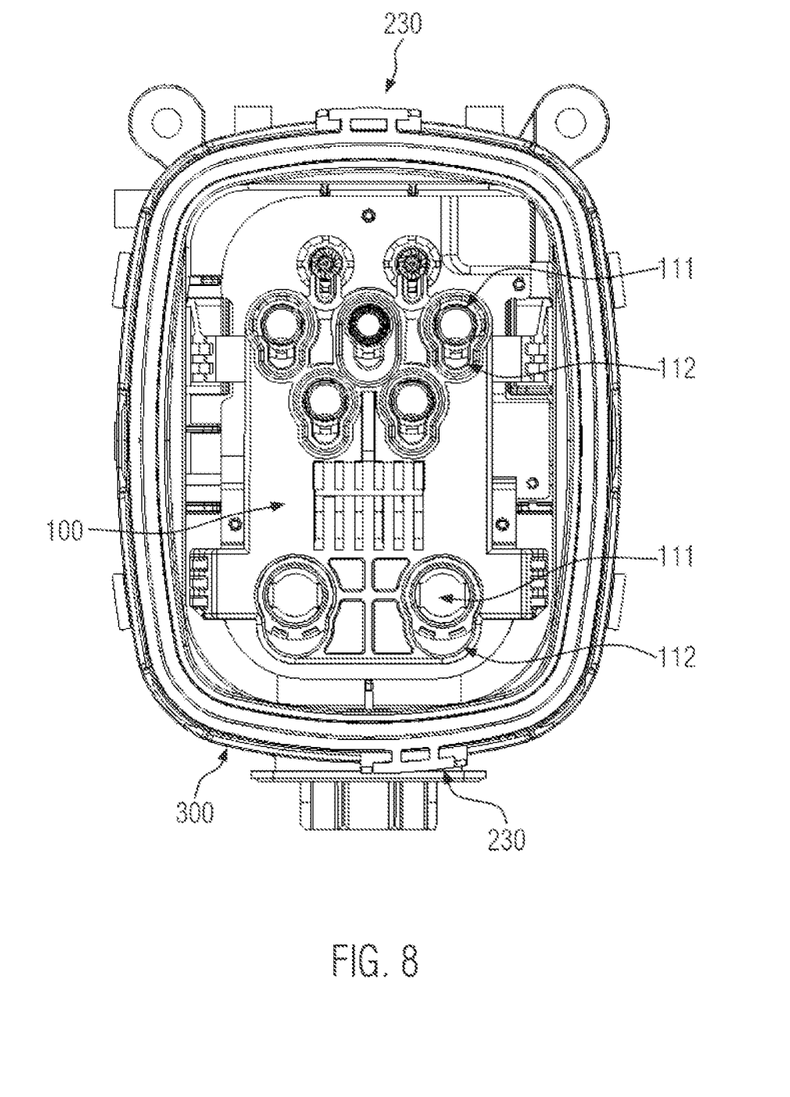
FIG. 8 schematically illustrates a top view of the locking element assembled with the inlet housing, according to an embodiment of the present invention.

It should be understood that even if seven openings 110 are disclosed in FIGS. 1 and 8, any number of opening 110 could be formed on the locking element 100, for instance one, two, three, four or more. Moreover, it has to be understood that the openings 110 may have different shapes and dimensions to accommodate corresponding terminals having different shapes and dimensions.

Figure 2:
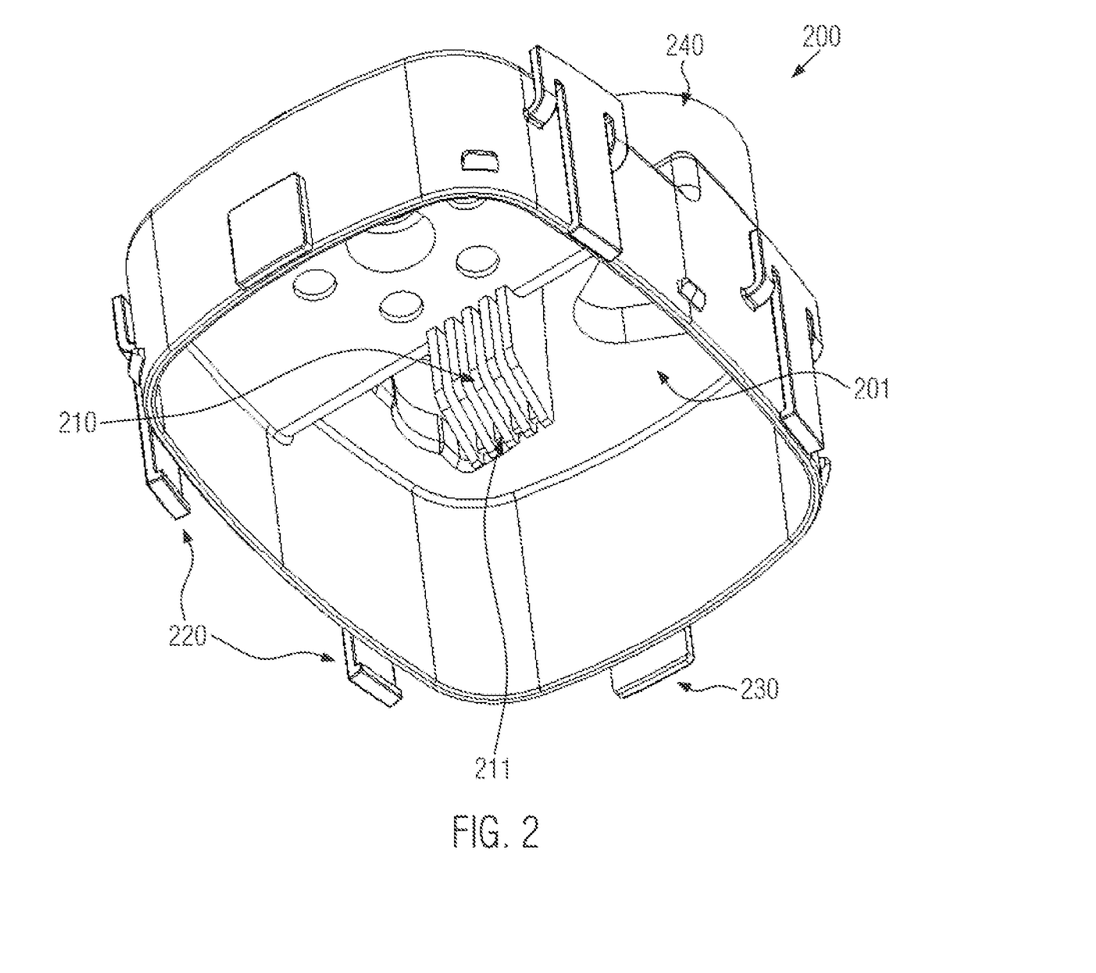
FIG. 2 schematically illustrates a three dimensional view of the cable inlet cover, according to an embodiment of the present invention.
Figure 5:
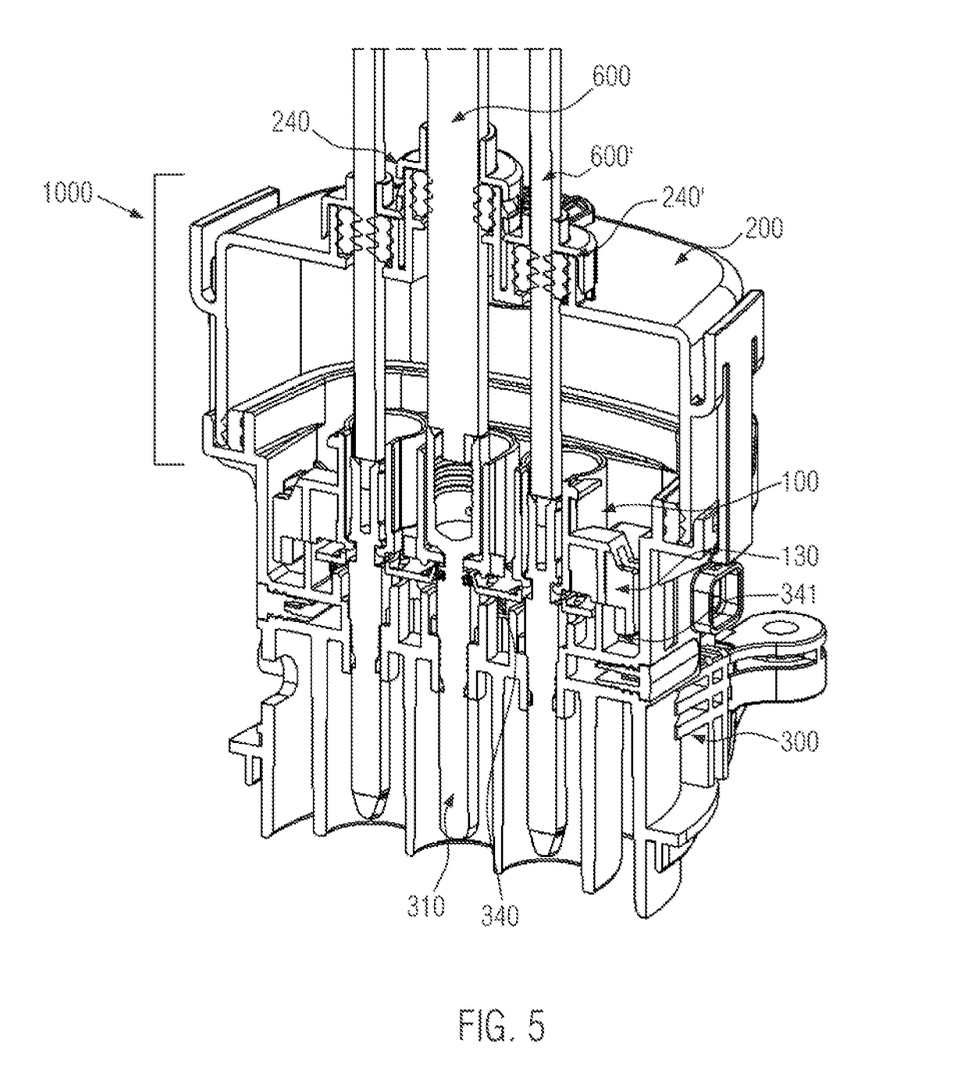
FIG. 5 schematically illustrates a cutout lateral view of the inlet housing assembly further provided with electrical cables, according to an embodiment of the present invention.
Figure 6:
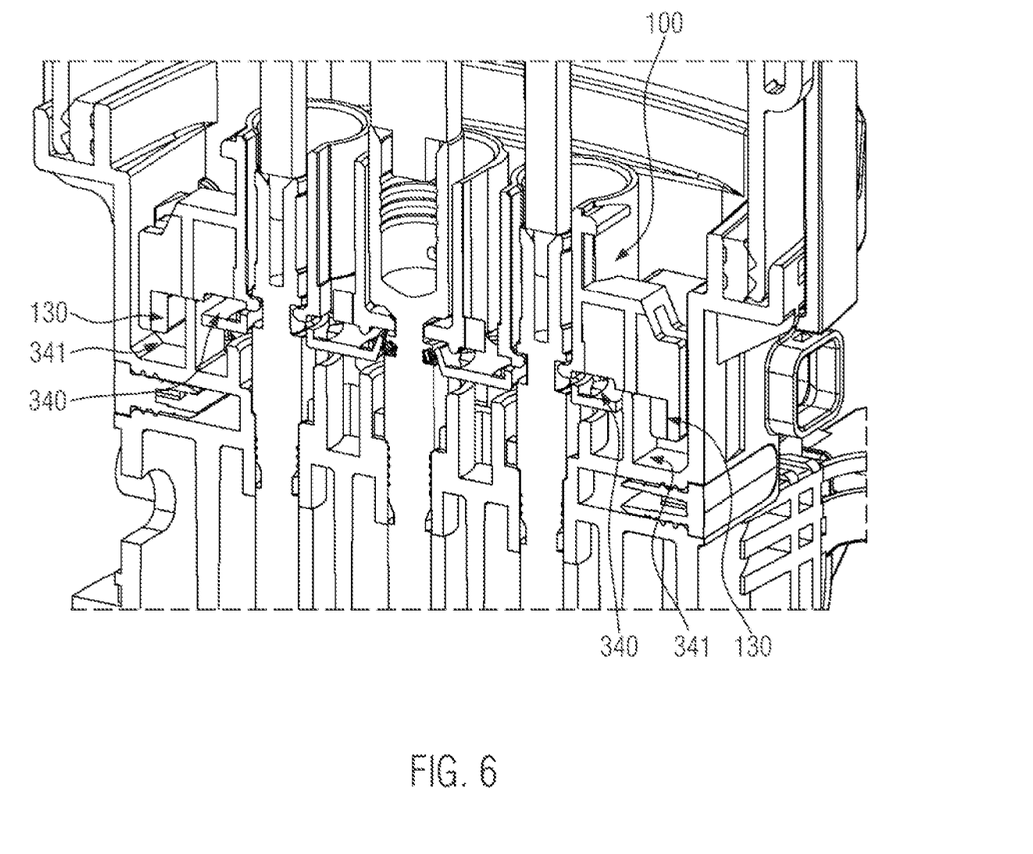
FIG. 6 schematically illustrates the position of the locking element in the inlet housing, according to an embodiment of the present invention.

FIG. 2 schematically illustrates a three-dimensional view of the cable inlet cover 200, according to an embodiment of the present invention. The cable inlet cover 200 has the shape of a parallelepiped solid having an opening. A first surface of the cable inlet cover 200 is provided with a plurality of inlets 240, 240' for the insertion of a corresponding cables. Inside the cable inlet cover 200, a second coupling element 210 is formed, which is configured to be coupled with the corresponding first coupling element 120 formed on the locking element 100 and to ensure automatic sliding of the locking element 100. The second coupling element 210 is a protruding structure having a slanted surface 211, which can slide over the corresponding slanted surface of the first coupling element 120. A plurality of grooves is preferably formed on the second slanted surface 211 of the second coupling element 210 to make the structure lighter and easier to be produced. The locking element 100 and the cable inlet cover 200 may be coupled to form a cable inlet assembly 1000, as shown in FIGS. 5 and 6.

Figure 3:
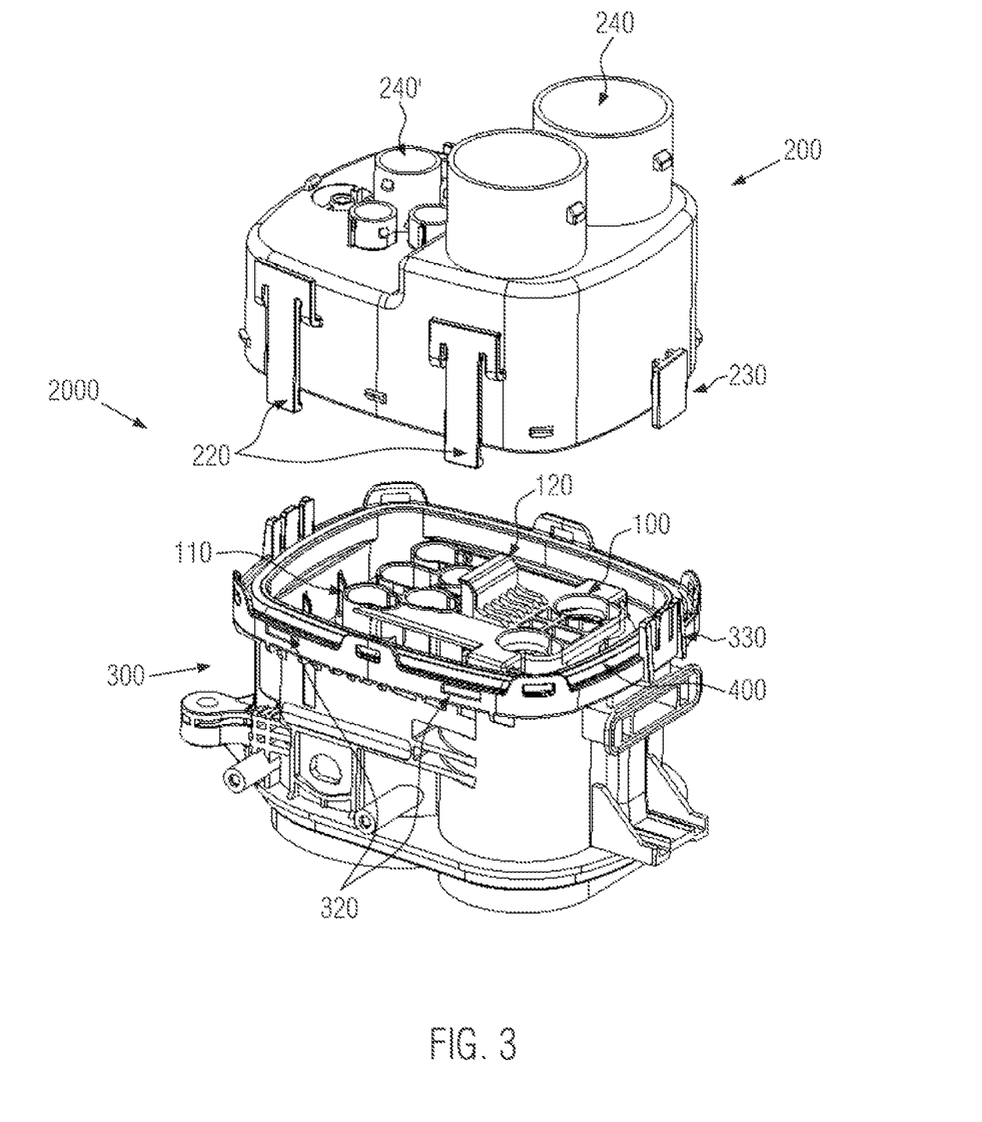
FIG. 3 schematically illustrates an exploded view of the inlet housing assembly, according to an embodiment of the present invention.

The lateral surfaces of the cable inlet cover 200 are provided with pre-positioning elements 220 comprising latches, which are designed to ensure the correct positioning between the cable inlet cover 200 and the inlet housing 300 closed by the cover 200 (see FIG. 3). In particular, the longer lateral sides are provided with four pre-positioning elements 220, namely two on each side. The shorter lateral surfaces are further provided with two centering elements 230, namely one on each side. It has to be understood that even if four pre-positioning elements 220 are disclosed, any even number of pre-positioning elements 220 could be formed on the cable inlet cover 200, for instance, two, six, eight or more. In the same way, even if two centering elements 230 are disclosed in FIG. 2, any even number of centering elements could be formed on the cable inlet cover 200, for instance, four, six or more centering elements 230. Preferably, the pre-positioning elements 220 are formed in even numbers and they are symmetrically disposed to ensure a symmetrical engagement between the cable inlet cover 200 and the inlet housing 300.

The centering elements 230 are not symmetrically distributed along the perimeter of the cable inlet cover 200, as they are designed to define a preferred orientation of the cable inlet cover 200. For instance, as it can be seen in FIG. 8 or 9, the two centering elements 230 are not positioned along the same axis and they are slightly offset from each other. In this way, during the assembly process, the user is prevented from mounting the second coupling element 210 having the wrong orientation with respect to the first coupling element 120. In other words, the centering elements 320 ensure that the two coupling elements are mounted in such a way that the first slanted surface 211 can slide along the second slanted surface 121. Moreover, the centering elements 230 prevents any tilting of the cable inlet cover 200 with respect to the inlet housing 300.

The working principle of the pre-positioning elements 220 and of the centering elements 230 is described with reference to FIGS. 10 and 11. The cable inlet cover 200 is configured to close a corresponding opening of an inlet housing 300. It should be understood that the term "inlet housing 300" indicates any electrical component comprising a plurality of electrical terminals and/or any number of electrical contacts.

A three-dimensional view of the inlet housing assembly 2000 comprising the inlet housing 300, the locking element 100 and the cable inlet cover 200 is schematically represented in FIG. 3. In the exploded view of the inlet housing assembly 2000 of FIG. 3, it can be clearly seen that the inlet housing 300 comprises an opening, wherein one or more cables having terminals can be inserted into corresponding terminal channels and connected with the corresponding electrical terminals. Preferably, the external perimeter of the inlet housing 300 is further provided with a sealing element 400 for ensuring protection against water or dust.

The locking element 100 can be snapped onto the inlet housing 300, so as to lock the position of the terminals of the cables, once they are correctly inserted into the corresponding terminal channels. One or more cable terminals 500 can be inserted into the inlet housing 300 and connected to the corresponding terminals (see also FIG. 7). When the locking element 100 is driven into the locked position, the plurality of terminals is simultaneously blocked in the connection position.

The first coupling element 120 protrudes from the flat surface of the locking element 100 and faces towards the cable inlet cover 200. The first coupling element 120 is aligned with the second coupling element 210 of the cable inlet cover 200, so that the two coupling elements can slide one over the other and cause a reciprocal movement of the cable inlet cover 200 and the locking element 100. As it will be described in the following, the correct alignment of the two coupling elements is ensured by the correct engagement of the pre-positioning elements 230 with the corresponding pre-positioning seats 320.

FIGS. 4, 5 and 6 schematically show cutout lateral views of the inlet housing assembly 2000, according to the present invention. In FIGS. 4, 5 and 6, it is possible to see how the locking element 100 is positioned inside the inlet housing 300. As also illustrated in FIG. 1, the locking element 100 comprises base elements 130. The base element 130 may be inserted into a guide slot 341 formed on the inlet housing 300. The guide slot 341 forms a sliding track, along which the locking element 100 is free to slide between the unlocked position and the locked position. As it can be seen in detail in FIG. 6, the inlet housing 300 further comprises support surfaces 340, which support the locking element 100 and enable its sliding. The flat portion of the locking element 100 lies on the support flat surfaces 340 and is free to slide over them.

In FIG. 4, the inner structure of the terminal channel 360 for inserting cable terminals is clearly visible. The inlet housing 300 may further include a primary locking element 350 extending into the terminal channel 360 to engage and retain the cable terminal 500 in the terminal channel 360. The primary locking element 350 may be for example a primary latch, such as that disclosed in U.S. Pat. No. 10,850,631.

Figure 7:
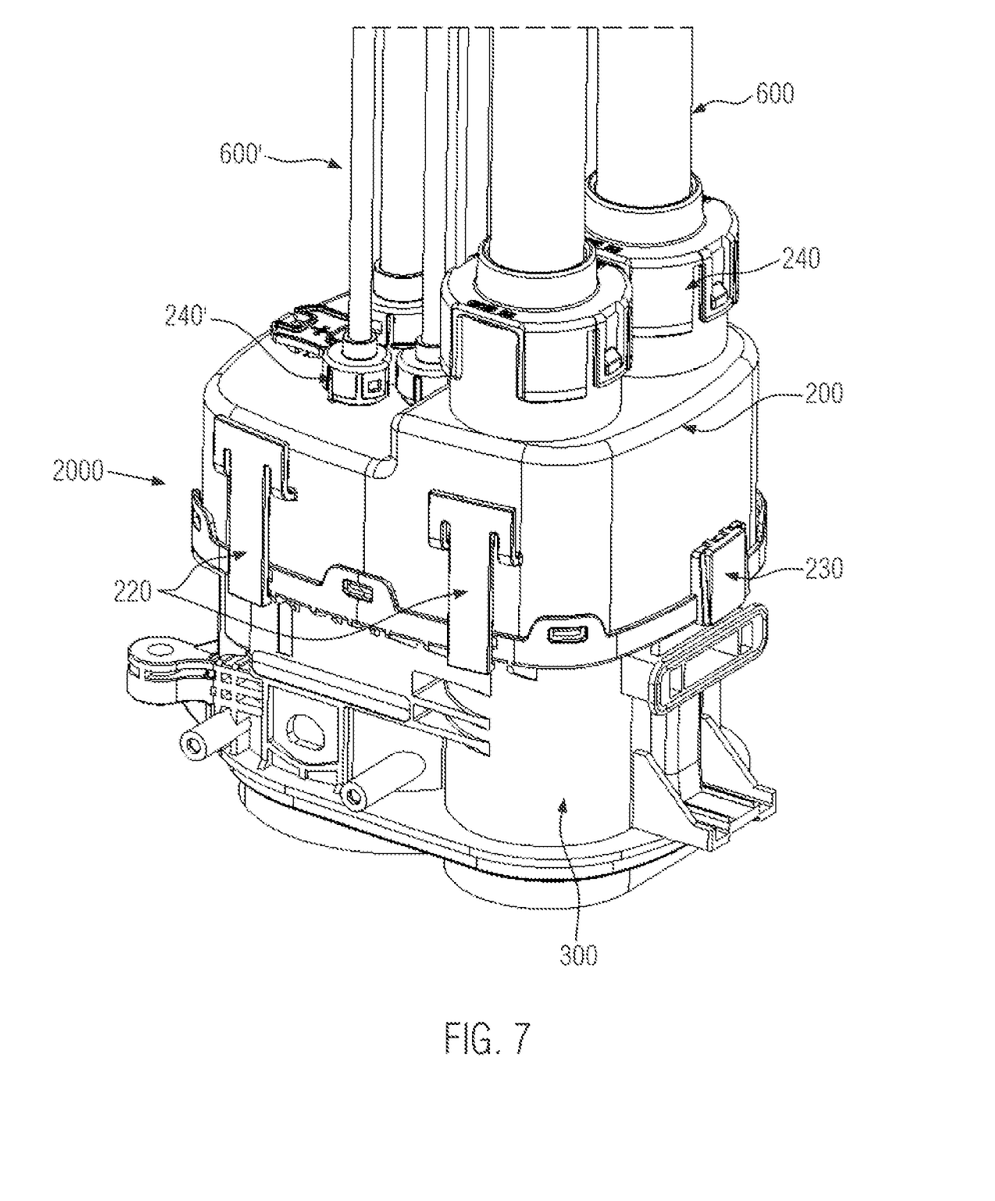
FIG. 7 schematically illustrates a sectional view of the inlet housing assembly further provided with electrical cables, according to an embodiment of the present invention.

FIGS. 5 and 7 schematically illustrate the inlet housing assembly 2000 further comprising the cables 600, 600'. As described above, the cable inlet cover 200 may comprise a plurality of inlets 240, 240' for receiving corresponding terminals 500. The inlets 240 and 240' can have different diameters, so as to receive terminals having different dimensions. The cables 600, 600' are preferably inserted into the corresponding inlets 240, 240' when the locking element 100 is accommodated inside the inlet housing 300 and after the cable inlet cover 200 has been preliminarily positioned on the inlet housing 300. Preferably, the position of the cables 600, 600' is further fixed by means of additional capping means which enclose the inlets 240, 240'.

Figure 9:
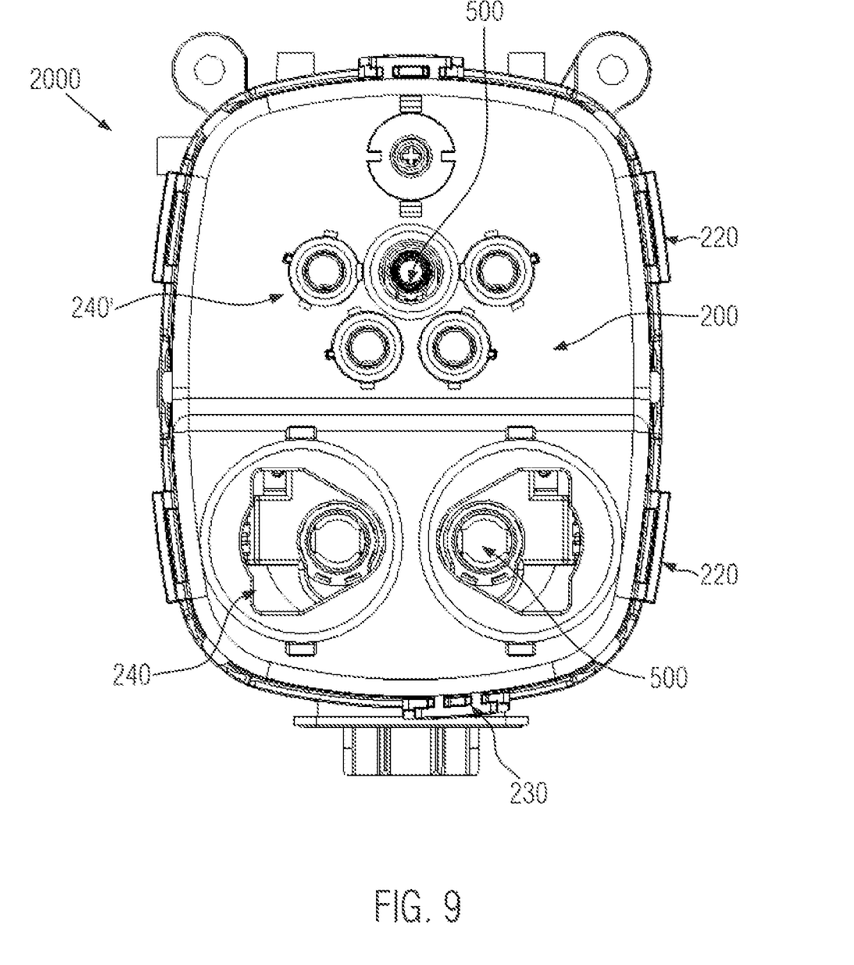
FIG. 9 schematically illustrates a top view of the inlet housing assembly, according to an embodiment of the present invention.

A top view of the inlet housing assembly 2000 is schematically illustrated in FIG. 9. As can be seen from FIG. 9, the inlets 240 and 240' of the cable inlet cover 200 are aligned with the openings 110 of the locking element 100 and with the terminals 310 of the inlet housing 300. When the cables 600, 600' having terminals 500 are inserted into the cable inlet assembly from the top, they are guided by the inlets 240, 240' and then by the openings 110, and can reach the corresponding electrical terminals 310 and establish the electrical connection.

The working principle of the inlet housing assembly 2000, according to the present invention, is schematically illustrated with reference to FIGS. 10 and 11. FIG. 10 schematically illustrates a side view of the inlet housing assembly 2000, wherein the locking element 100 is accommodated inside the inlet housing 300 and the cable inlet cover 200 closes the inlet housing 300. As explained above and as detailed also with reference to FIGS. 12 and 13 below, the cable inlet cover 200 is correctly positioned on the inlet housing 300 thanks to the pre-positioning elements 220 and the centering elements 230.

In the initial configuration, the first coupling element 120 and the second coupling element 210 are partially in contact and only an edge of the second slanted surface 211 abuts on an edge of the first slanted surface of 121. This can be seen in the enlarged view in FIG. 10. From this initial configuration, a vertical force along the direction D1, which is parallel to the direction of insertion of the cables 600, 600', is applied to the cable inlet cover 200. As a result of the application of the vertical force D1, the second coupling element 210 slides along the first coupling element 120, namely the second slanted surface 211 slides along the first slanted surface 121. The sliding of the first slanted surface 121 and the second slanted surface 211 determines a displacement of the locking element 100 along the horizontal direction D2, which is perpendicular to the vertical direction D1. In this way, the vertical force D1 applied to the cable inlet cover 200 is transformed into a horizontal force along the direction D2 thanks to the reciprocal sliding of the locking element 100 and the cable inlet cover 200, as a consequence of the reciprocal sliding of the first coupling element 120 and the second coupling element 210. The displacement of the locking element 100 along the direction D2 allows the insertion of the cable terminal 500 first into the first circle 111 and then into the second circle 112 of the opening 110 of the locking element 100. Therefore, the reciprocal sliding of the cable inlet cover 200 and the locking element 100 determines the change of the position of the cable terminal 500 into the corresponding openings 110 of the locking element 100. As illustrated in FIG. 11, when the terminal 500 is accommodated into the second circle 112 of the openings 110, the terminal 500 is blocked and thus cannot move from its connection position inside the terminal channel 360.

After sliding of the first coupling element 120 and the second coupling element 210, a portion of the second coupling element 210 remains behind the first coupling element 120 and prevents it from moving backwards (see enlarged view in FIG. 11). Therefore, after the initial sliding induced by the vertical force D1 to the cable inlet cover 200, the reciprocal position of the cable inlet cover 200 and the locking element 100 is fixed. In this way, after closing the cable inlet cover 200, the locking element 100 cannot move backwards, and a secure blocking between the two elements is ensured.

Figure 12:
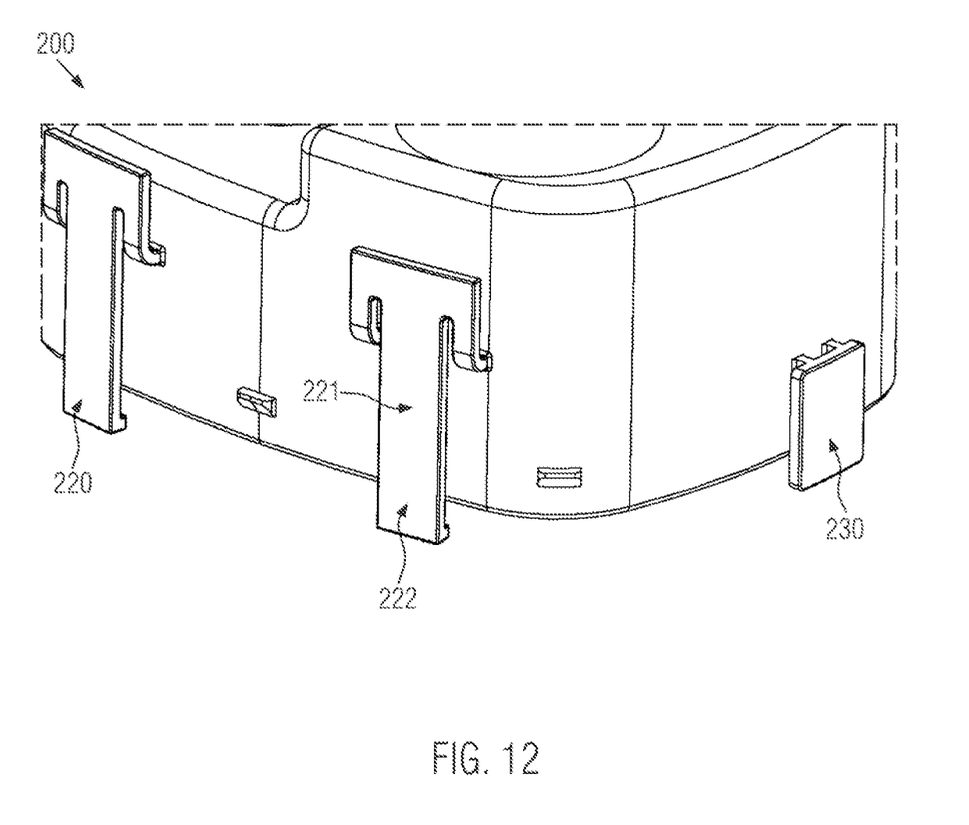
FIG. 12 schematically illustrates a lateral view of the cable inlet cover and shows a detail of the pre-positioning elements and of the centering elements, according to an embodiment of the present invention.
Figure 13:
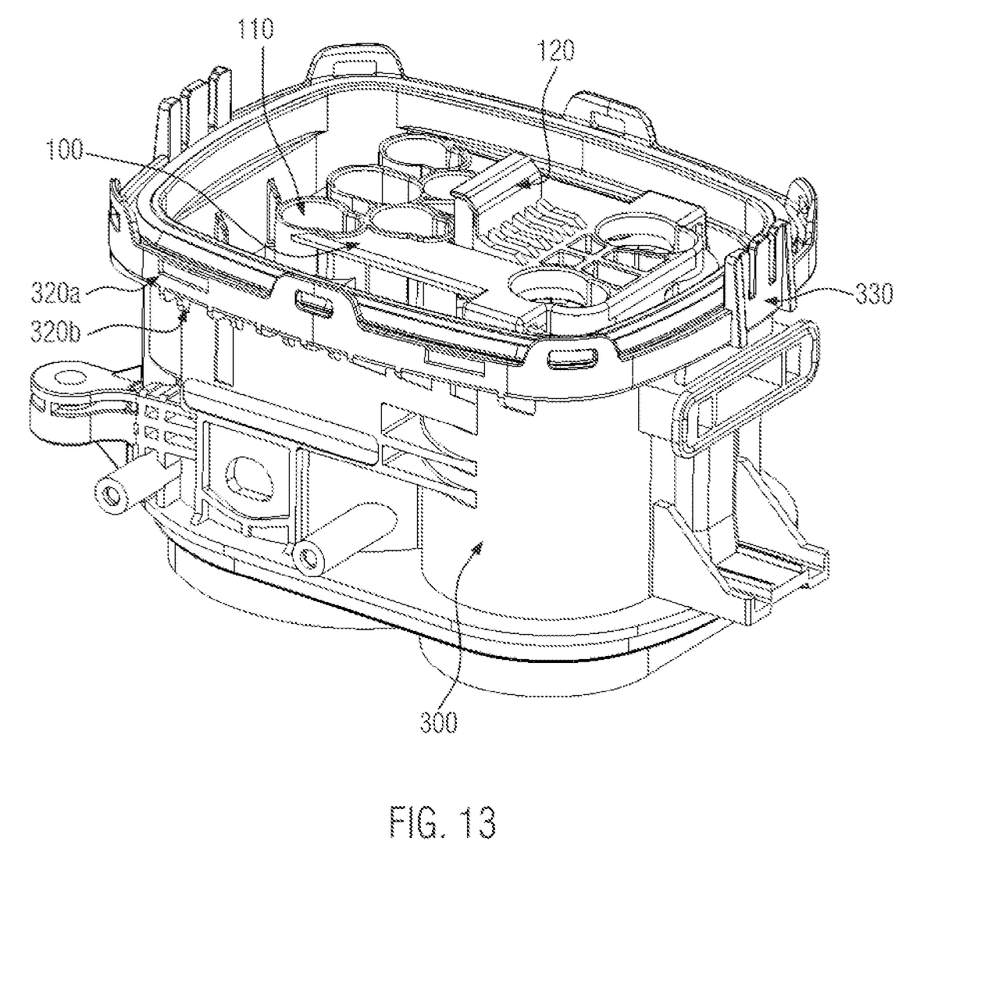
FIG. 13 schematically illustrates a lateral view of the locking element assembled with the inlet housing, wherein it is possible to distinguish the two blocking seats of the pre-positioning seats, according to an embodiment of the present invention.

FIG. 12 schematically represents a lateral view of the cable inlet cover 200, according to an embodiment of the present invention. In particular, FIG. 12 shows in detail the pre-positioning elements 220 and the centering elements 230. Each pre-positioning element 220 comprises a first portion 221 and a second portion 222 having a hooking portion, which can be latched to the pre-positioning seats 320 of the inlet housing. As can be seen in FIG. 13, the pre-positioning seats 320 comprise a latching groove 320*a* and a latching edge 320*b* for receiving the hooking portion 222 of the pre-positioning elements 220. To engage and disengage the pre-positioning elements 220 with the corresponding pre-positioning seats 320, it is sufficient to slightly press on the first portion 221, so as to lift up the hooking portion 222. The hooking portion 222 may be then latched to the latching groove 320*a* of the pre-positioning seats 320 or to the latching edge 320*b*, according to the user's needs. When the pre-positioning elements 220 are received in the latching groove 320*a* of the pre-positioning seats 320, the cable inlet cover 200 and the inlet housing 300 are arranged in a first blocking position; when the pre-positioning elements 220 are latched to the latching edge 320*b* of the pre-positioning seats 320, the cable inlet cover 200 and the inlet housing 300 are arranged in a second blocking position.

In the first blocking configuration, the first coupling element 120 and the second coupling element 210 are not completely in contact, but only an edge of the first coupling element 120 abuts on an edge of the second coupling element 210. The first blocking configuration thus corresponds to the initial configuration prior to sliding, wherein the locking element 100 is in the unlocked position (see FIG. 10). The position of the pre-positioning elements 220 into the corresponding seats 320, in the first blocking configuration, may be seen in FIG. 4.

In the second blocking configuration, the first coupling element 120 and the second coupling element 210 have completed the sliding and they abuts on each other (see FIG. 11). Moreover, a portion of the second coupling element 210 is placed behind the first coupling element 120, so as to block any potential backwards movement of the locking element 100 (see FIG. 11). The position of the pre-positioning elements 220 into the corresponding seats 320, in the second blocking configuration, may be seen in FIG. 7.

FIG. 12 schematically illustrates also the centering elements 230, comprising latches that can be engaged with corresponding centering seats 330 formed on the inlet housing 300. The engagement between the centering elements 230 and the centering seats 330 ensures a uniform distribution of the vertical force applied to the cable inlet cover 200. In this way, tilting of the cable inlet cover assembly 200 with respect to the inlet housing 300 is avoided. The pre-positioning elements 220 and the centering elements 230 preferably protrude from the body of the cable inlet cover 200 of the same amount, so that the hooking portion 222 of the pre-positioning elements 220 is at the same level as the end portion of the centering elements 230. In this way, when the cable inlet cover 200 is positioned on the inlet housing 300 and the pre-positioning elements 220 and the centering elements 230 are engaged in the second blocking configuration, the structure is stable.

When assembling the cable inlet cover 200 and the inlet housing 300, the user simply needs to engage the pre-positioning elements 220 with the corresponding seats 320 in the first blocking configuration. This ensures that the inlets 240, 240' of the cable inlet cover 200 and the electrical terminals 310 of the inlet housing are aligned and that the first coupling element 120 and the second coupling element 210 are correctly coupled. In a preferred embodiment, during operation, the user may slightly push on the first portion 221 of the pre-positioning elements 220 and also apply the vertical force D1 to the cable inlet cover 200, in order to drive the inlet housing assembly 2000 from the first blocking configuration to the second blocking configuration and ensure correct locking of the terminals.

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

For instance, it is clear that, even if FIGS. 5 and 7 disclose cable configurations set at 180°, also other cable configurations, for instance, set at 90°, may be realized with the present invention.

Moreover, in an alternative embodiment, the locking element 100 may comprise a plurality of first coupling elements 120 configured to be coupled with a plurality of corresponding second coupling elements 210. For example, four first coupling elements 120 may be formed on the locking element 100, namely one coupling element 120 on each corner; accordingly, four second coupling elements 210 may be formed on the cable inlet cover 200, namely one coupling element 210 on each corner.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of

What is claimed is:

1. A cable inlet assembly for an inlet housing, comprising:
   a cable inlet cover covering an inlet for at least one cable; and
   a locking element slidable between an unlocked position and a locked position, including:
     at least one opening adapted to receive a terminal of the at least one cable;
     a first coupling element coupled with a second coupling element of the cable inlet cover, a displacement of the cable inlet cover along a first direction contacts and slides the locking element along a second direction, distinct from the first direction, between the unlocked position and the locked position for locking a position of the terminal.

2. The cable inlet assembly according to claim 1, wherein the first coupling element includes a sliding element and the second coupling element comprises a protruding slanted element, and the sliding element and the protruding slanted element sliding along each other.

3. The cable inlet assembly according to claim 1, wherein the first coupling element defines a first slanted surface abutting against a second slanted surface of the second coupling element such that the first coupling element and the second coupling element slide one over the other.

4. The cable inlet assembly according to claim 3, wherein the second coupling element protrudes from an inner surface of the cable inlet cover facing the locking element.

5. The cable inlet assembly according to claim 1, wherein, after the sliding of the locking element, a portion of the second coupling element remains positioned behind the first coupling element and fixes the relative position between the locking element and the cable inlet cover.

6. The cable inlet assembly according to claim 5, wherein the at least one opening is defined by a first circle and a second circle intersecting the first circle, sliding the locking element inserts the terminal of the at least one cable into the first circle and then into the second circle.

7. The cable inlet assembly according to claim 6, wherein the first circle is larger than the second circle and, when the terminal of the at least one cable is inserted into the second circle, the position of said terminal is locked.

8. The cable inlet assembly according to claim 7, wherein a diameter of the first circle is larger than a diameter of terminal of the at least one cable.

9. The cable inlet assembly according to claim 8, wherein a diameter of the second circle is equal to the diameter of the terminal of the at least one cable such that when the terminal is inserted into the second circle, the position of the terminal is locked.

10. The cable inlet assembly according to claim 1, wherein the first direction is a vertical direction and the second direction is orthogonal to the first direction.

11. An inlet housing assembly containing at least one electrical terminal, comprising:
    an inlet housing;
    a cable inlet assembly attached to the inlet housing, including:
      a cable inlet cover covering an inlet for at least one cable; and
      a locking element slidable between an unlocked position and a locked position, including:
        at least one opening adapted to receive a terminal of the at least one cable; and
        a first coupling element coupled with a second coupling element of the cable inlet cover, a displacement of the cable inlet cover along a vertical direction contacts and slides the locking element along an orthogonal direction between the unlocked position and the locked position for locking a position of the terminal.

12. The inlet housing assembly according to claim 11, wherein the inlet housing comprises a guide slot for guiding the locking element during sliding between the unlocked position and the locked position.

13. The inlet housing assembly according to claim 12, wherein the cable inlet cover defines one or more pre-positioning elements comprising latches to be coupled with corresponding pre-positioning seats formed on the inlet housing and positioning the cable inlet cover with respect to the inlet housing.

14. The inlet housing assembly according to claim 13, wherein each of the seats comprises two blocking seats for each of the pre-positioning elements.

15. The inlet housing assembly according to claim 14, wherein the cable inlet cover includes centering elements engaging with corresponding centering seats formed on the inlet housing for positioning of the cable inlet cover with respect to the inlet housing.

16. The inlet housing assembly according to claim 11, wherein the at least one opening is defined by a first circle and a second circle intersecting the first circle, and sliding the locking element inserts the terminal of the at least one cable into the first circle and then into the second circle.

17. A method for locking the position of a terminal of at least one cable connected to at least one electrical terminal of an inlet housing, comprising:
    positioning a locking element onto the inlet housing, the locking element including at least one opening for inserting the terminal of the at least one cable;
    covering the locking element and the inlet housing with a cable inlet cover;
    positioning the cable inlet cover such that a first coupling element formed on the locking element is in contact with a second coupling element protruding from the cable inlet cover; and
    pushing the cable inlet cover along a vertical direction such that a vertical displacement of the cable inlet cover contacts and displaces the locking element along an orthogonal direction between an unlocked position and a locked position wherein the position of the terminal of the at least one cable is fixed.

18. The method according to claim 17, further comprising the step of controlling the positioning of the cable inlet cover by engaging pre-positioning latches formed on the cable inlet cover with corresponding pre-positioning seats formed on the inlet housing.

19. The method according to claim 17, further comprising the step of inserting at least one cable comprising a terminal into the corresponding inlets of the cable inlet cover.

20. The method according to claim 19, further comprising the step of controlling the positioning of the cable inlet cover by engaging centering elements formed on the cable inlet cover with corresponding centering seats formed on the inlet housing.

* * * * *